(12) United States Patent
Kekura

(10) Patent No.: US 11,613,645 B2
(45) Date of Patent: Mar. 28, 2023

(54) PHOTOCURABLE COMPOSITION, CURED BODY, GASKET IN WHICH CURED BODY IS USED, WATERTIGHT STRUCTURE, AND METHOD FOR MANUFACTURING GASKET

(71) Applicant: SEKISUI POLYMATECH CO., LTD., Saitama (JP)

(72) Inventor: Yu Kekura, Saitama (JP)

(73) Assignee: SEKISUI POLYMATECH CO., LTD., Saitama (JP)

( * ) Notice: Subject to any disclaimer, the term of this patent is extended or adjusted under 35 U.S.C. 154(b) by 0 days.

(21) Appl. No.: 17/791,518

(22) PCT Filed: Mar. 24, 2021

(86) PCT No.: PCT/JP2021/012404
§ 371 (c)(1),
(2) Date: Jul. 7, 2022

(87) PCT Pub. No.: WO2021/193770
PCT Pub. Date: Sep. 30, 2021

(65) Prior Publication Data
US 2023/0040225 A1 Feb. 9, 2023

(30) Foreign Application Priority Data
Mar. 27, 2020 (JP) .............................. JP2020-057493

(51) Int. Cl.
*C08L 33/14* (2006.01)
*F16J 15/10* (2006.01)

(52) U.S. Cl.
CPC ............. *C08L 33/14* (2013.01); *F16J 15/102* (2013.01)

(58) Field of Classification Search
CPC .. F16J 15/02; F16J 15/021; F16J 15/10; F16J 15/102; C08L 33/14
See application file for complete search history.

(56) References Cited

U.S. PATENT DOCUMENTS

| | | |
|---|---|---|
| 2007/0203296 A1 | 8/2007 | Okada et al. |
| 2009/0004541 A1* | 1/2009 | Jacobine ............ H01M 8/0284 264/494 |
| 2009/0025870 A1 | 1/2009 | Tanaka |
| 2009/0240004 A1* | 9/2009 | Maier ................. C09D 175/04 525/457 |
| 2011/0068512 A1 | 3/2011 | DeCato et al. |
| 2014/0045963 A1 | 2/2014 | Tanaka |
| 2014/0283983 A1 | 9/2014 | Schall et al. |
| 2018/0230256 A1 | 8/2018 | Yamamuro |

FOREIGN PATENT DOCUMENTS

| | | |
|---|---|---|
| JP | 2011-527722 A | 11/2011 |
| JP | 2012-229338 A | 11/2012 |
| JP | 2013-049805 A | 3/2013 |
| JP | 2014-526585 A | 10/2014 |
| JP | 2017-122139 A | 7/2017 |
| JP | 2018-154775 A | 10/2018 |
| JP | 2019-026748 A | 2/2019 |
| WO | WO2005/087890 A1 | 9/2005 |
| WO | WO2007/004584 A1 | 1/2007 |
| WO | WO2016/051915 A1 | 4/2016 |

OTHER PUBLICATIONS

International Search Report for PCT Patent App. No. PCT/JP2021/012404 (dated Jun. 1, 2021).

* cited by examiner

*Primary Examiner* — Gilbert Y Lee
(74) *Attorney, Agent, or Firm* — Cermak Nakajima & McGowan LLP; Tomoko Nakajima

(57) ABSTRACT

A photocurable composition is provided. A cured product formed by curing the photocurable composition has reworkability and excellent heat resistance while having flexibility. The photocurable composition includes a telechelic acrylic polymer having an acryloyl group at both ends; a polyfunctional acrylic polymer having acryloyl groups; a monofunctional acrylic monomer; and a fumed silica including at least one of a hydrophilic fumed silica or a fumed silica having a polar group. The photocurable composition has a Martens hardness of 0.07 to 0.75 N/mm$^2$, where the Martens hardness is a hardness after the photocurable composition is cured.

9 Claims, No Drawings

PHOTOCURABLE COMPOSITION, CURED BODY, GASKET IN WHICH CURED BODY IS USED, WATERTIGHT STRUCTURE, AND METHOD FOR MANUFACTURING GASKET

This application is a national phase entry under 35 U.S.C. § 371 of PCT Patent Application No. PCT/JP2021/012404, filed on Mar. 24, 2021, which claims priority under 35 U.S.C. § 119 to Japanese Patent Application No. 2020-057493, filed Mar. 27, 2020, both of which are incorporated by reference.

TECHNICAL FIELD

The present invention relates to a photocurable composition, a cured body thereof, and a gasket in which the cured body is used. In addition, the present invention relates to a watertight structure and a method for manufacturing a gasket.

BACKGROUND ART

Photocurable compositions are in a liquid form before being applied and, after being applied, form cured bodies by being photocured. Photocurable compositions can be used as encapsulating members, gaskets, and the like by being sufficiently cured after being applied to a desired region. In instances where a gasket is to be formed, in particular, flexibility is required, and, accordingly, some known gaskets are of the type formed by photocuring a liquid composition including, as a major component, a rubber-based oligomer formed of an isoprene backbone, a butadiene backbone, a urethane backbone, or the like and having an acryloyl group. Such technologies are described, for example, in Japanese Unexamined Patent Application Publication No. 2013-49805 (Patent Literature 1) and the like.

CITATION LIST

Patent Literature

PTL 1: Japanese Unexamined Patent Application Publication No. 2013-49805

SUMMARY OF INVENTION

Technical Problem

Unfortunately, such technologies present a problem of poor reworkability because the formulation for providing flexibility tends to cause surface tackiness.

Solution to Problem

According to an aspect of the present invention, a photocurable composition includes a telechelic acrylic polymer having an acryloyl group at both ends; a polyfunctional acrylic polymer having acryloyl groups; a monofunctional acrylic monomer; and a fumed silica including at least one of a hydrophilic fumed silica or a fumed silica having a polar group, wherein the photocurable composition has a Martens hardness of 0.07 to 0.75 N/mm$^2$, where the Martens hardness is a hardness after the photocurable composition is cured.

In the aspect of the present invention, the photocurable composition includes a telechelic acrylic polymer having an acryloyl group at both ends; a polyfunctional acrylic polymer having acryloyl groups; a monofunctional acrylic monomer; and a fumed silica including at least one of a hydrophilic fumed silica or a fumed silica having a polar group, and, consequently, the photocurable composition has excellent flexibility and reworkability while having heat resistance.

Because of the Martens hardness after curing of 0.07 to 0.75 N/mm$^2$, a cured body of the photocurable composition does not exert a significant stress on an object to which the cured body is bonded; therefore, deformation of the object due to the cured body of the photocurable composition can be inhibited.

According to another aspect of the present invention, a photocurable composition includes an acrylic polymer having a double bond equivalent weight of 10,000 or greater; a monofunctional acrylic monomer; and a fumed silica including at least one of a hydrophilic fumed silica or a fumed silica having a polar group, wherein the photocurable composition has a Martens hardness of 0.07 to 0.75 N/mm$^2$, where the Martens hardness is a hardness after the photocurable composition is cured.

In the aspect of the present invention, the photocurable composition includes an acrylic polymer having a double bond equivalent weight of 10,000 or greater; a monofunctional acrylic monomer; and a fumed silica including at least one of a hydrophilic fumed silica or a fumed silica having a polar group, and, consequently, the photocurable composition has excellent flexibility and reworkability while having heat resistance. Furthermore, the photocurable composition has a Martens hardness of 0.07 to 0.75 N/mm$^2$, where the Martens hardness is a hardness after the photocurable composition is cured; consequently, a cured body of the photocurable composition has excellent flexibility and reworkability while having heat resistance, and in addition, the cured body does not exert a significant stress on an object to which the cured body is bonded; therefore, deformation of the object due to the cured body of the photocurable composition can be inhibited.

According to another aspect of the present invention, the photocurable compositions further include a polyfunctional photocurable monomer.

In the aspect of the present invention, a polyfunctional photocurable monomer is further included, and, consequently, an ultra-high-temperature compression set can be improved.

According to another aspect of the present invention, the photocurable compositions are ones in which the fumed silica includes the hydrophilic fumed silica and a hydrophobic fumed silica having a polar group. In the aspect of the present invention, the fumed silica includes the hydrophilic fumed silica and a hydrophobic fumed silica having a polar group, and, consequently, the photocurable compositions have an increased thixotropic property while having heat resistance, even when a proportion of the included fumed silica relative to the polymer components such as the telechelic acrylic polymer is small; as a result, it is possible to inhibit, after the application of any of the photocurable compositions, the photocurable composition from spreading before being cured. Furthermore, an increase in hardness of the cured product due to the inclusion of a fumed silica can be minimized, and, therefore, the resulting cured body of any of the photocurable compositions has high flexibility.

According to another aspect of the present invention, the photocurable compositions are ones in which the fumed silica includes an amino-treated fumed silica. In the aspect of the present invention, the photocurable compositions are ones in which the fumed silica includes an amino-treated fumed silica, and, consequently, the photocurable compositions have an increased thixotropic property even when the proportion of the included fumed silica relative to the polymer components such as the telechelic acrylic polymer is further reduced; as a result, it is possible to inhibit, after the application of any of the photocurable compositions, the photocurable composition from spreading before being cured.

According to another aspect of the present invention, the photocurable compositions are ones in which the telechelic acrylic polymer is present in an amount of 22 to 71 mass %, the polyfunctional acrylic polymer is present in an amount of 7 to 54 mass %, the monofunctional acrylic monomer is present in an amount of 3 to 27 mass %, the polyfunctional photocurable monomer is present in an amount of 0 to 10 mass %, and the fumed silica is present in an amount of 2 to 20 mass %. In the aspect of the present invention, the telechelic acrylic polymer is present in an amount of 22 to 71 mass %, the polyfunctional acrylic polymer is present in an amount of 7 to 54 mass %, the monofunctional acrylic monomer is present in an amount of 3 to 27 mass %, the polyfunctional photocurable monomer is present in an amount of 0 to 10 mass %, and the fumed silica is present in an amount of 2 to 20 mass %, and, consequently, the photocurable compositions have excellent flexibility and reworkability while having heat resistance.

According to another aspect of the present invention, the photocurable compositions have an adhesion strength with respect to aluminum of 0.45 N/mm$^2$ or less, where the adhesion strength is an adhesion strength after any of the photocurable compositions is cured and compressed at 70° C. for 22 hours. In the aspect of the present invention, the adhesion strength with respect to aluminum is 0.45 N/mm$^2$ or less, where the adhesion strength is an adhesion strength after any of the photocurable compositions is cured and compressed at 70° C. for 22 hours; consequently, tackiness is low, which provides excellent reworkability.

According to another aspect of the present invention, the photocurable compositions have a compression set of 40% or less, where the compression set is a compression set after any of the photocurable compositions is cured and allowed to stand at 120° C. for 100 hours in accordance with JIS K6262:2013. In the aspect of the present invention, the compression set is 40% or less, where the compression set is a compression set after any of the photocurable compositions is cured and allowed to stand at 120° C. for 100 hours in accordance with JIS K6262:2013; consequently, the photocurable compositions have heat resistance. Furthermore, when the compression set after curing is 30% or less, the photocurable compositions have excellent heat resistance.

According to another aspect of the present invention, a cured body of any of the photocurable compositions is provided. In the aspect of the present invention, the cured body is a cured body of any of the photocurable compositions, and consequently, the cured body has excellent flexibility and reworkability while having heat resistance.

According to another aspect of the present invention, a gasket being a cured body of any of the photocurable compositions is provided. In the aspect of the present invention, the gasket is a gasket being a cured body of any of the photocurable compositions, and consequently, the gasket has excellent flexibility and reworkability while having heat resistance.

According to another aspect of the present invention, a watertight structure is provided which includes a case having an opening; a cap member closing the opening; and a gasket made of a cured body of any of the photocurable compositions, the gasket being provided on at least one of the case or the cap member, the gasket being a gasket that liquid-tightly seals the opening by being compressed and deformed by fitting between the case and the cap member.

In the watertight structure, the gasket is a cured body of any of the photocurable compositions, and, consequently, the gasket has excellent flexibility and reworkability while having heat resistance.

According to another aspect of the present invention, a method for manufacturing a gasket includes the steps of applying any of the photocurable compositions to an object that is to be sealed; and irradiating the applied photocurable composition with actinic radiation. The gasket manufactured in this manner is a gasket having excellent flexibility and reworkability while having heat resistance.

Reference is made to an acrylic monomer, an acrylic polymer, and an acryloyl group, as referred to in the present specification and the claims. The term "acrylic monomer" has the same meaning as a "(meth)acrylic monomer" and is used to refer to not only acrylic acid ester monomers but also methacrylic acid ester monomers. Similarly, the term "acrylic polymer" has the same meaning as a "(meth)acrylic polymer" and is used to refer to not only acrylic acid ester polymers but also methacrylic acid ester polymers. Similarly, the term "acryloyl group" has the same meaning as a "(meth)acryloyl group" and is used to refer to not only acryloyl groups but also methacryloyl groups. Furthermore, both the acrylic monomer and the acrylic polymer are compounds having a radically polymerizable group, and any of the compounds resulting from a radical polymerization reaction are distinguished by being referred to as a "cured body". The photocurable composition is one that can form a cured body when the (meth)acryloyl groups of the acrylic monomer and the acrylic polymer are caused to undergo a photocuring reaction.

Advantageous Effects of Invention

According to aspects of the present invention, photocurable compositions are provided, and cured products formed therefrom have reworkability and excellent heat resistance while having flexibility.

DESCRIPTION OF EMBODIMENTS

<Photocurable Composition>:

According to an embodiment, a photocurable composition is a photocurable composition including a telechelic acrylic polymer having an acryloyl group at both ends; a polyfunctional acrylic polymer having acryloyl groups; a monofunctional acrylic monomer; and a fumed silica, and the photocurable composition has a Martens hardness of 0.07 to 0.75 N/mm$^2$, where the Martens hardness is a hardness after the photocurable composition is cured.

The telechelic acrylic polymer having an acryloyl group at both ends (hereinafter also referred to simply as a "telechelic acrylic polymer") is a reactive polyacrylate polymer with acryloyl being at both ends. As used herein, the term "polymer" includes "oligomer". The telechelic acrylic polymer has a backbone formed by polymerizing a (meth)acrylic monomer and has a weight average molecular weight (Mw) of 5,000 to 55,000. The telechelic acrylic polymer is a polymer having high heat resistance, oil resistance, and chemical resistance and also having rubber elasticity with flexibility. The presence of acryloyl groups at the ends enables photocuring of a radical polymerization type to occur.

By way of example, it is preferable that the polymerization of the (meth)acrylic monomer be carried out by living polymerization. Cured products of the telechelic acrylic polymer having a backbone resulting from living polymerization can have a uniform three-dimensional matrix and, therefore, are cured products that are flexible and have excellent heat resistance. Furthermore, from an industrial standpoint, it is particularly preferable that the telechelic acrylic polymer be formed by using a living radical polymerization method, among other living polymerization methods. It is preferable that the telechelic acrylic polymer have a ratio of Mw/Mn between 1 and 2.

The backbone of the telechelic acrylic polymer has a structure in which a (meth)acrylic acid or an ester thereof is polymerized. Specific examples of structural units from which the backbone is synthesized include (meth)acrylic acid alkyl esters, such as methyl (meth)acrylate, ethyl (meth) acrylate, butyl (meth)acrylate, 2-ethylhexyl (meth)acrylate, isobutyl (meth)acrylate, lauryl acrylate, and isostearyl acrylate; and (meth)acrylic acid alkoxy esters, such as 2-methoxyethyl (meth)acrylate, 2-ethoxyethyl (meth)acrylate, 2-methoxyethyl (meth)acrylate, 3-methoxybutyl (meth) acrylate, 2-hydroxyethyl (meth)acrylate, 4-hydroxybutyl (meth) acrylate, 2-hydroxypropyl (meth)acrylate, and glycidyl (meth)acrylate. Note that the monomer that forms the telechelic acrylic polymer may be a monomer formed of one structural unit or a monomer synthesized from two or more structural units. Examples of telechelic acrylic polymers that may be used include XMAP (trade name), manufactured by Kaneka Corporation.

The telechelic acrylic polymer may be present in an amount of 18 to 80 mass % in the photocurable composition. More preferably, the amount is 21 to 75 mass %, and even more preferably, 22 to 71 mass %. The use of a telechelic acrylic polymer can impart heat resistance, flexibility, and reworkability to the cured product of the photocurable composition. If the content of the telechelic acrylic polymer is less than 18 mass %, a compression set may be degraded, and a predetermined heat resistance may not be achieved. Furthermore, if the content is greater than 80 mass %, tackiness may increase, which may compromise reworkability. The content of the telechelic acrylic polymer may be low, which is preferable from the standpoint of improving reworkability, or the content may be high, which is preferable from the standpoint of heat resistance.

The polyfunctional acrylic polymer having acryloyl groups (hereinafter also referred to simply as a "polyfunctional acrylic polymer") is a reactive polyacrylate polymer including a skeleton formed of a polymer of a (meth)acrylic acid ester and having acryloyl groups. The polyfunctional acrylic polymer has a molecular weight (Mw) of 30,000 to 400,000. The polyfunctional acrylic polymer is a polymer that can increase a crosslink density of the photocurable composition, which is achieved by the crosslinking of multiple (meth)acryloyl groups. In the present specification and the claims, the "polyfunctional acrylic polymer" does not include the telechelic acrylic polymer. This is because the term "polyfunctional acrylic polymer" is intended to refer to polyfunctional acrylic polymers other than telechelic acrylic polymers.

The backbone of the polyfunctional acrylic polymer has a structure in which a (meth)acrylic acid or an ester thereof is polymerized. Specific examples of structural units from which the backbone is synthesized include (meth)acrylic acid alkyl esters, such as methyl (meth)acrylate, ethyl (meth) acrylate, butyl (meth)acrylate, 2-ethylhexyl (meth)acrylate, isobutyl (meth)acrylate, lauryl acrylate, and isostearyl acrylate; and (meth)acrylic acid alkoxy esters, such as 2-methoxyethyl (meth)acrylate, 2-ethoxyethyl (meth) acrylate, 2-methoxyethyl (meth) acrylate, 3-methoxybutyl (meth) acrylate, 2-hydroxyethyl (meth)acrylate, 4-hydroxybutyl (meth)acrylate, 2-hydroxypropyl (meth)acrylate, and glycidyl (meth)acrylate. Note that the monomer that forms the polyfunctional acrylic polymer may be a single monomer or two or more monomers.

The polyfunctional acrylic polymer has a plurality of (meth)acryloyl groups, and the term "polyfunctional" means that two or more (meth)acryloyl groups are present. Preferably, the polyfunctional acrylic polymer is a tri- or higher functional polymer.

Note that the polyfunctional acrylic polymer may be any acrylic polymer as long as the acrylic polymer has a plurality of (meth)acryloyl groups and a backbone having a structure in which a (meth)acrylic acid or an ester thereof is polymerized. For example, the polyfunctional acrylic polymer may include, in addition to the backbone, an amide linkage, an ether linkage, a linkage of an ester that is not derived from an acrylic acid, and/or the like. Furthermore, the polyfunctional acrylic polymer may include one or more other functional groups, in addition to the (meth)acryloyl groups. Examples of the other functional groups include carboxyl groups, hydroxyl groups, and glycidyl groups.

Examples of commercially available products of such acrylic acrylates include Art Cure (trade name), manufactured by Negami chemical industrial co., ltd.

The polyfunctional acrylic polymer may be present in an amount of 3 to 75 mass % in the photocurable composition. More preferably, the amount is 5 to 60 mass %, and even more preferably, 7 to 54 mass %. The use of a polyfunctional acrylic polymer can impart heat resistance, flexibility, and reworkability to the cured product of the photocurable composition. If the content of the polyfunctional acrylic polymer is less than 3 mass %, tackiness may be degraded, which may compromise reworkability. Furthermore, if the content is greater than 75 mass %, viscosity may increase, and tackiness may be degraded. The content of the polyfunctional acrylic polymer may neither be high nor low, which is preferable from the standpoint of tackiness, or the content may be low, which is preferable from the standpoint of viscosity.

The telechelic acrylic polymer and the polyfunctional acrylic polymer may be present in a total amount of 60 to 90 mass % in the photocurable composition. More preferably, the total amount is 65 to 85 mass %, and even more preferably, 70 to 80 mass %. If the total amount is less than 60 mass %, hardness may increase, the compression set may be degraded, and the heat resistance may be degraded. Furthermore, if the total amount is greater than 90 mass %, tackiness may be degraded, and reworkability may be degraded.

A double bond equivalent weight is a value obtained by dividing a molecular weight of a polymer of interest by the number of ethylenic double bonds per molecule. The telechelic acrylic polymer having an acryloyl group at both ends and the polyfunctional acrylic polymer having acryloyl groups both have ethylenic double bonds, and, therefore, for both of these, the double bond equivalent weight can be expressed. It is preferable that the double bond equivalent weight of the telechelic acrylic polymer having an acryloyl group at both ends and the double bond equivalent weight of the polyfunctional acrylic polymer having acryloyl groups both be greater than or equal to 10,000. In preferred embodiments, the double bond equivalent weights may be 10,000 to 15,000, 10,000 to 20,000, or 10,000 to 50,000. If the double bond equivalent weights are less than 10,000, hardness may be high, flexibility may be poor, and durability may be inferior. If the double bond equivalent weights are excessively high, a crosslink density associated with covalent bonding may be reduced, and since pseudo crosslinking due to entanglement of molecular chains increases, a compression set at high temperatures may be degraded. Furthermore, from the standpoint of reworkability, it is preferable that the double bond equivalent weight be close to 10,000.

The monofunctional acrylic monomer is a component that is cured by a photoradical polymerization initiator. Before being cured, the monofunctional acrylic monomer is a low-viscosity liquid. Examples of the monofunctional acrylic monomer include monofunctional alicyclic (meth) acrylic acid ester monomers, monofunctional aliphatic (meth)acrylic acid ester monomers, monofunctional ether-containing (meth)acrylic acid ester monomers, and monofunctional imide-containing (meth)acrylic acid ester monomers.

As used herein, the term "monofunctional alicyclic (meth) acrylic acid ester monomers" is intended to include monofunctional alicyclic acrylic acid ester monomers and monofunctional alicyclic methacrylic acid ester monomers. The term "monofunctional aliphatic (meth)acrylic acid ester monomers" is intended to include monofunctional aliphatic acrylic acid ester monomers and monofunctional aliphatic methacrylic acid ester monomers. The same applies to the monofunctional ether-containing (meth)acrylic acid ester monomers and the monofunctional imide-containing (meth) acrylic acid ester monomers. Furthermore, a "highly polar monofunctional monomer" may be included in the present invention, and the term is intended to include a polar-group-containing monofunctional acrylic acid ester monomer, a polar-group-containing monofunctional methacrylic acid ester monomer.

Monofunctional Alicyclic (Meth)acrylic Acid Ester Monomer:

The monofunctional alicyclic (meth)acrylic acid ester monomer is a low-viscosity liquid composition and is a component that adjusts a viscosity of the photocurable composition. Furthermore, the monofunctional alicyclic (meth)acrylic acid ester monomer can toughen the cured body and increase a Young's modulus thereof and, further, can increase an adhesion strength thereof while making it possible to reduce a glue residue that is left when the cured body is peeled away from an object to which the cured body has been bonded. In addition, in instances where a proportion of this component is increased, heat resistance and moisture resistance can be increased, and, consequently, a compression set in high-temperature environments can be reduced.

Specific examples of the monofunctional alicyclic (meth) acrylic acid ester monomer include isobornyl acrylate, cyclohexyl acrylate, dicyclopentanyl acrylate, 3,3,5-trimethylcyclohexyl acrylate, and 4-tert-butyl cyclohexyl acrylate.

Monofunctional Aliphatic (Meth)acrylic Acid Ester Monomer:

The monofunctional aliphatic (meth)acrylic acid ester monomer is also a low-viscosity liquid composition and is a component that can adjust the viscosity of the photocurable composition as with the monofunctional alicyclic (meth) acrylic acid ester monomer described above. The inclusion of the monofunctional aliphatic (meth)acrylic acid ester monomer can reduce the Young's modulus of the cured body, thereby increasing the flexibility thereof.

Specific examples of the monofunctional aliphatic (meth) acrylic acid ester monomer include aliphatic ether-containing (meth)acrylic acid ester monomers, such as ethoxydiethylene glycol acrylate, 2-ethylhexyl-diglycol acrylate, and butoxyethyl acrylate; and aliphatic hydrocarbon-containing (meth)acrylic acid ester monomers, such as butyl acrylate, 2-ethylhexyl acrylate, lauryl acrylate, stearyl acrylate, isostearyl acrylate, decyl acrylate, isodecyl acrylate, isononyl acrylate, and n-octyl acrylate. In instances where an aliphatic hydrocarbon-containing (meth)acrylic acid ester monomer is used, the viscosity of the photocurable resin composition can be reduced, and the Young's modulus of the cured body can be reduced, which in turn can increase the flexibility thereof. It is preferable, from the standpoint of reworkability, that the monofunctional acrylic monomer be present in a proportion of less than or equal to 27 mass %.

Monofunctional Imide-Containing (Meth)acrylic Acid Ester Monomer:

Similar to other (meth)acrylic acid ester monomers, the monofunctional imide-containing (meth)acrylic acid ester monomer is also a component that can adjust the viscosity of the photocurable composition. In instances where a monofunctional imide-containing (meth)acrylic acid ester monomer is included, the Young's modulus of the cured body can be reduced, which in turn can increase the flexibility thereof. Furthermore, the compression set in high-temperature environments can be reduced. Furthermore, in instances where a maleimide compound, which has a relatively poor compatibility, among other polyfunctional photocurable monomers, is additionally used, uniform mixing of the maleimide compound can be facilitated.

Specific examples of the monofunctional imide-containing (meth)acrylic acid ester monomer include N-acryloyloxyethyl hexahydrophthalimide, N-(acryloyloxy) succinimide, and 3-phthalimidopropionic acid acrylate.

Regarding alicyclic acrylic monomers, among others, in instances where an alicyclic acrylic monomer is used, the heat resistance of the cured body can be increased while the flexibility thereof is maintained, in contrast to instances in which an aliphatic acrylic monomer is added, which does not result in an increase in the heat resistance of the cured body. Furthermore, the cured body of an alicyclic acrylic monomer provides water tightness and the like for electronic devices and substrates by adhering thereto. In instances where the cured body is used as a sealing member, the alicyclic acrylic monomer can increase an adhesion strength while making it possible to reduce a glue residue that is left when the cured body is peeled away from an object to which the cured body has been bonded. Furthermore, the alicyclic acrylic monomer has an effect of toughening the cured body and increasing the Young's modulus thereof. In addition, in instances where a proportion of this component is increased, moisture resistance can be increased. Furthermore, tackiness on a surface of the cured body can be inhibited.

With regard to alicyclic acrylic monomers, a comparison between acrylic acid ester monomers and methacrylic acid ester monomers suggests that using an acrylic acid ester monomer is preferable. This is because many acrylic acid ester monomers have excellent photocurability and, therefore, can be cured with a relatively low cumulative amount of light, and in addition, cured bodies thereof tend to be flexible.

The monofunctional acrylic monomer, such as an alicyclic acrylic monomer, may be present in an amount of 2 to 35 mass % in the photocurable composition. More preferably, the amount is 2 to 28 mass %, even more preferably, 3 to 27 mass %, and particularly preferably, 6 to 23 mass %. The use of an alicyclic acrylic monomer can impart heat resistance, flexibility, and reworkability to the cured product of the photocurable composition. Furthermore, the photocurable composition can be made to have a suitable viscosity. If the content of the alicyclic acrylic monomer is less than 5 mass %, tackiness may be degraded, which may compromise reworkability. On the other hand, if the content is greater than 35 mass %, the compression set may be degraded, and the heat resistance may be degraded. The content of the alicyclic acrylic monomer may neither be high nor low, which is preferable from the standpoint of viscosity. In a preferred embodiment, the alicyclic acrylic monomer may be present in an amount of 3 to 27 mass % in the photocurable composition.

In addition, a polyfunctional photocurable monomer that serves as a crosslinking agent may be included. Specific examples of the polyfunctional photocurable monomer include polar-group-containing polyfunctional photocurable monomers, such as N-acryloyloxyethyl hexahydrophthalimide, tris(2-acryloyloxyethyl)isocyanurate, caprolactone modified tris-(2-acryloxyethyl)isocyanurate, and 2-hydroxy-1,3-dimethacryloxypropane; polyfunctional photocurable monomers having an aliphatic skeleton, such as neopentylglycol diacrylate, dioxane glycol diacrylate, tricyclodecane dimethanol diacrylate, 1,9-nonanediol diacrylate, 1,10-decanediol diacrylate, trimethylolpropane triacrylate, pentaerythritol tetraacrylate, pentaerythritol triacrylate, pentaerythritol tetraacrylate, dipentaerythritol polyacrylate, and 1,6'-bismaleimido-(2,2,4-trimethyl) hexane; and polyfunctional photocurable monomers having an aromatic skeleton, such as 9,9-bis[4-(2-hydroxyethoxy)phenyl]fluorene diacrylate, ethoxylated bisphenol A diacrylate, and bisphenol A diphenyl ether bismaleimide. Note that in the description of crosslinking agents, the term "polar group" in the phrase "having a polar group" or "polar-group-containing" means a "polar group other than a photocurable group", that is, the term means a polar group other than the polar group that contributes to the curing reaction initiated by a photoinitiator. Accordingly, the polar group in this instance does not encompass the acrylic group or the methacrylic group included in the monofunctional acrylic monomer or the maleimide group of the maleimide.

Regarding the polyfunctional photocurable monomers, it is preferable that the number of photocurable groups be small, from the standpoint of inhibiting an increase in hardness. Furthermore, in addition to this, it is further preferable, from the standpoint of even limiting an ultra-high-temperature compression set to a low level, that the polyfunctional photocurable monomer have an aliphatic skeleton and not have a polar group. Examples of such polyfunctional photocurable monomers include trimethylolpropane triacrylate and pentaerythritol tetraacrylate.

The polyfunctional photocurable monomer is not necessarily an essential component. If included, the polyfunctional photocurable monomer may be present in an amount of 0.5 to 10 mass % in the photocurable composition. Preferably, the amount is 0.7 to 6.0 mass %, and more preferably, 1.8 to 4.5 mass %. The addition of a polyfunctional photocurable monomer improves the ultra-high-temperature compression set of the cured product of the photocurable composition. If the content of the polyfunctional photocurable monomer is less than 0.5 mass %, the effect of improving the ultra-high-temperature compression set cannot be produced. On the other hand, if the content is greater than 10 mass %, a disadvantage arises in that elongation and flexibility are degraded.

The photocurable composition includes a thixotropic agent added thereto. This is because the addition of a thixotropic agent increases a thixotropic property and, therefore, inhibits dripping from occurring during application, thereby enhancing a shape retention property (shape maintaining property) of the applied photocurable composition. For example, in instances where the photocurable composition is applied to a three-dimensional object by using a dispenser, the curing can be accomplished in a state in which the shape provided by the application of the photocurable composition is maintained; therefore, in instances where the cured body is used as a gasket material or an encapsulating member, the photocurable composition is suitable.

Specific examples of the thixotropic agent include inorganic thixotropic agents made of an inorganic powder including a silica, aluminum oxide, titanium oxide, or the like; and organic thixotropic agents, such as hydrogenated castor oils, amide waxes, and carboxymethyl celluloses. Preferably, the thixotropic agent is an inorganic powder; in particular, a silica is preferable, and a fumed silica is more preferable. A reason for this is that in instances where an inorganic powder that has undergone a predetermined surface treatment can easily control a hydrogen ion exponent (pH) of the photocurable composition, and surface-treated silica powders can be easily procured compared with other surface-treated inorganic powders.

Regarding fumed silicas, there are different types of fumed silicas, such as fumed silicas having a polar group; hydrophobic fumed silicas having no polar groups; and hydrophilic fumed silicas. All of these fumed silicas have an effect of reducing tackiness. However, using a hydrophilic fumed silica or a fumed silica having a polar group or using a combination of these is preferable from the standpoint of improving reworkability. Examples of fumed silicas having a polar group include amino-treated fumed silicas and (meth)acryloyl silicas. Amino-treated fumed silicas have a pH of 8.5 to 11.0. (Meth)acryloyl silicas are excellent in terms of the effect of reducing tackiness.

In instances where a fumed silica is used as the thixotropic agent, the fumed silica may be present in an amount less than 20 mass % in the photocurable composition. More preferably, the amount is 1.0 to 10 mass %, and more preferably, 2.5 to 5.0 mass %. The use of a thixotropic agent enhances the shape retention property of the photocurable composition and can impart heat resistance and reworkability to the cured product. If no thixotropic agent is included, tackiness may be degraded, which may compromise reworkability. Furthermore, if the amount is greater than 20 mass %, viscosity may increase, and hardness may increase. The amount of the thixotropic agent may be high, which is preferable from the standpoint of improving reworkability, or the amount may be low, which is preferable from the standpoint of viscosity or hardness. In a preferred embodiment, a fumed silica may be present in an amount of 2 to 10 mass % in the photocurable composition.

Regarding the amount of addition of the fumed silica, using different types of fumed silicas in combination is advantageous because in this case, the amount of addition can be reduced in association with tackiness reduction, compared with using one type of fumed silica. Furthermore, among fumed silicas, a hydrophilic fumed silica and an amino-treated fumed silica may be used in combination; in this case, the thixotropic property can be increased approximately two-fold compared with an instance in which a different silica is added at the same concentration. Furthermore, in instances where a hydrophilic fumed silica and a fumed silica having a polar group are used by being mixed together, it is preferable that a mixing ratio between these fumed silicas be 4:1 to 1:4 (hydrophilic fumed silica:fumed silica having a polar group). With such a ratio, the thixotropic property can be increased effectively.

A photoradical polymerization initiator serves to cause the formation of radicals, thereby causing a photoradical polymerization reaction to cure the telechelic acrylic polymer having an acryloyl group at both ends, the polyfunctional acrylic polymer having acryloyl groups, and the monofunctional acrylic monomer. Furthermore, for example, in instances where the fumed silica has an acryloyl group, this acryloyl group, too, can be caused to undergo a photoradical polymerization reaction. Examples of the photoradical polymerization initiator include photoradical polymerization initiators such as benzophenone-based initiators, thioxanthone-based initiators, acetophenone-based initiators, acylphosphine-based initiators, oxime ester-based initiators, alkylphenone-based initiators, and intramolecular hydrogen abstraction-type initiators.

Examples of the alkylphenone-based initiators include 2,2-dimethoxy-2-phenylacetophenone, 1-hydroxycyclohexyl phenyl ketone, 2-hydroxy-2-methyl methyl propanone, 1-[4-(2-hydroxyethoxy)-phenyl]-2-hydroxy-methyl propanone, 2-hydroxy-1-(4-(4-(2-hydroxy-2-methylpropionyl)-benzyl)-phenyl)-2-methylpropan-1-one, 2-methyl-1-[4-(methylthio)phenyl]-2-morpholinopropan-1-one, 2-benzyl-2-(dimethylamino)-4'-morpholino butylphenone, and 2-dimethylamino-2-(4-methyl-benzyl)-1-(4-morpholin-4-yl-phenyl)-butan-1-one.

Examples of the acylphosphine-based initiators (acylphosphine oxide-based initiators) include 2,4,6-trimethylbenzoyl-diphenyl phosphine oxide and bis(2,4,6-trimethylbenzoyl)phenyl phosphine oxide.

Examples of the intramolecular hydrogen abstraction-type initiators include methyl benzoylformate and a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester.

Examples of the oxime ester-based initiators (oxy-phenyl-acetic acid ester-based initiators) include 1-[4-(phenylthio)phenyl]-octane-1,2-dione=2-(O-benzoyloxime) and 1-[9-ethyl-6-(2-methylbenzoyl)-9H-carbazol-3-yl]ethanone (0-acetoxime).

Examples of the photoradical polymerization initiator include Omnirad 184, Omnirad 907, Omnirad 369, Omnirad 1173, Omnirad 127, Omnirad TPO, Omnirad 819, Omnirad 754, and Omnirad MBF (trade names), manufactured by IGM Resins, and Irgacure OXE01, Irgacure OXE02, Irgacure OXE03, and Irgacure OXE04 (trade names), manufactured by BASF.

An amount of addition of the photoradical polymerization initiator is preferably 0.1 to 10 parts by mass and more preferably 1 to 8 parts by mass, per 100 parts by mass of the photocurable composition. This is because if the amount is less than 0.1 parts by mass, sufficient polymerization may not be achieved, which may result in a failure of completion of curing, and even if the amount of addition is greater than 10 parts by mass, an effect of increasing a degree of polymerization does not increase significantly.

It is preferable that a plasticizing agent be added to the photocurable composition as necessary. The addition of a plasticizing agent can impart high flexibility to the cured body, and, therefore, such a photocurable composition is suitable in instances where the cured body is used as a gasket or a sealing member. Specific examples of the plasticizing agent include paraffinic oils, olefinic oils, naphthenic oils, and ester-based plasticizing agents. Specific examples of the ester-based plasticizing agents include phthalic acid esters, adipic acid esters, trimellitic acid esters, polyesters, phosphoric acid esters, citric acid esters, epoxidized vegetable oils, sebacic acid esters, azelaic acid esters, maleic acid esters, and benzoic acid esters. It is preferable that an amount of the plasticizing agent be less than or equal to 30 mass % to a mass of the photocurable composition taken as 100 mass %. If the amount is greater than 30 mass %, the possibility of bleeding of the plasticizing agent from the cured body increases.

In the photocurable composition, any of a variety of additives may be appropriately included within a range that does not depart from a purpose of the present invention. Examples thereof include silane coupling agents, polymerization inhibitors, defoaming agents, light stabilizers, antioxidants, antistatic agents, thermally conductive fillers, and other functional fillers, in addition to plasticizing agents and thixotropic agents, which are mentioned above.

It is preferable that the photocurable composition have a viscosity at 25° C. of 5 to 2,000 Pa·s. The viscosity is more preferably 10 to 1,000 Pa·s and even more preferably 20 to 300 Pa·s. If the viscosity is less than 5 Pa·s, dripping is likely to occur in instances in which the photocurable composition is applied to an electronic device or the like by using a dispenser. On the other hand, if the viscosity is greater than 2,000 Pa·s, application with a dispenser may become difficult. When the viscosity of the photocurable composition is within the range of 10 to 1,000 Pa·s, the photocurable composition can be suited to many dispenser devices, and, consequently, productivity is increased. Furthermore, when the viscosity is greater than or equal to 20 Pa·s, the shape retention property for the period from the application to the curing increases, and when the viscosity is less than or equal to 200 Pa·s, precise dispensing using a thinner needle is possible. Note that the viscosity may be a value measured by a B-type rotational viscometer at a rotational speed of 10 rpm and a measurement temperature of 25° C.

The degree to which the shape at the time of application of the photocurable composition can be maintained during the time after the application and subsequent irradiation with light until the completion of curing can be expressed as a thixotropic ratio. Being able to maintain the shape at the time of application is convenient for the utilization as a sealing member or a gasket, compared with instances in which dripping and spreading of the photocurable composition occurs immediately after the application.

From this standpoint, it is preferable that the thixotropic ratio of the photocurable composition at 25° C. be greater than or equal to 2. More preferably, the ratio is greater than or equal to 4. When the thixotropic ratio is greater than or equal to 2, it is possible to inhibit, after the application of the photocurable composition, the photocurable composition from spreading before being cured. Accordingly, such a thixotropic ratio is preferable for applications such as those in encapsulating members, sealing members, and gaskets. Furthermore, when the thixotropic ratio is greater than or equal to 4, the spreading can be reduced even when the photocurable composition has a particularly low viscosity, and, consequently, a precise shape can be formed by using a thinner needle. Note that the thixotropic ratio is a value determined as follows: viscosities are measured with a B-type rotational viscometer, at a measurement temperature of 25° C. and rotational speeds of 1 rpm and 10 rpm, and a ratio of the viscosity at 1 rpm to the viscosity at 10 rpm is calculated to give the value. Note that the upper limit of the thixotropic ratio is not limited and preferably may be less than or equal to approximately 20.

<Cured Body of Photocurable Composition>:

The photocurable composition can be cured by a photocuring reaction and, accordingly, can be used in a variety of applications, such as those in adhesives, masking members, gaskets, sealing members, and encapsulating members. For example, the photocurable composition may be applied to an electronic device or a portion where a metal is exposed, on an electronic substrate or the like, so that the object is covered, and subsequently, the photocurable composition may be photo-cured by irradiation with actinic radiation, such as UV radiation; accordingly, the resultant can serve as a sealing member. In another instance, the photocurable composition may be applied to an object that is to be sealed, such as a case, and thereafter may be covered with a cover, and then, the photocurable composition may be irradiated with actinic radiation, such as UV radiation or the like, to seal the case or the like with the cover; accordingly, the resultant can serve as a gasket. Note that a different type of actinic radiation, other than UV radiation, can be used. Examples of such actinic radiation include energy radiation that activates (meth)acryloyl groups, such as visible light and electron radiation, and energy radiation that causes the formation of radicals in a photoradical polymerization initiator. Examples of light sources for the irradiation with UV radiation include high-pressure mercury lamps, metal halide lamps, and UV LEDs.

Furthermore, the cured body of the photocurable composition of the present invention has the above-described composition and, therefore, has heat resistance. In addition, the Martens hardness as measured by a nanoindentation test is specified to be within the range of 0.07 to 0.75 $N/mm^2$. Consequently, the cured body has a predetermined pliability and flexibility and, therefore, is more suitable for gasket applications. Specifically, the Martens hardness can be measured by using a method described in the Examples section.

In instances where the cured body is used as a gasket, a watertight structure can be configured in which a case having an opening and a cover (or a cap or a cap member) that closes the opening are provided, and the cured body is provided therebetween, on at least one of the case and the cover; accordingly, the cured body can be used by being compressed and deformed by fitting between the case and the cover. Furthermore, since the cured body can liquid-tightly seal the opening, the watertight structure can be suitably formed.

Regarding the use in gasket applications and the like, instances may occur in which, during the operation of attaching the cover to the case, an operational error, such as attachment of an incorrect cover or a failure to achieve a precise attachment position of the cover, occurs; or in instances where a problem is encountered with a component inserted inside, such as a device, an additional operation, such as repair or replacement of the component, is needed. In these instances, the operations can be performed easily because of the excellent reworkability, that is, because the cover that has been attached can be easily removed from the case.

As described, aspects of the present invention provide photocurable compositions that can form cured products having flexibility and, in addition, having reworkability and excellent heat resistance. Furthermore, another aspect of the present invention provides a cured body of the photocurable composition, and the cured body can be used as a gasket and, in addition, can be used in a variety of applications, such as those in adhesives, masking members, sealing members, and encapsulating members. Furthermore, still another aspect of the present invention provides a watertight structure having reworkability and excellent heat resistance.

The embodiments described above are merely illustrative of the present invention, therefore, for example, changes may be made to the embodiments, or known technologies may be added to or combined with the embodiments, without departing from the spirit of the present invention. Such technologies are also encompassed by the scope of the present invention.

EXAMPLES

The present invention will now be described in further detail based on Examples (Comparative Examples).

Photocurable compositions having a composition shown in the tables below and cured bodies formed by curing the photocurable compositions were prepared, and these were designated as Samples 1 to 35. Various tests were conducted on the samples.

<Preparation of Samples 1 to 48>:

Raw materials were mixed together such that the composition for each of the samples was achieved. The raw materials included a telechelic acrylic polymer having an acryloyl group at both ends; a polyfunctional acrylic polymer having acryloyl groups; an acrylic monomer; and a fumed silica. After the raw materials were thoroughly mixed together, a photoradical polymerization initiator was mixed to give the photocurable compositions of Samples 1 to 48. The types and the weights (%) or compositions of the raw materials used in the samples are shown in the tables below. The thus prepared photocurable composition of each of the samples was irradiated with UV radiation (a high-pressure mercury lamp) under conditions including an illuminance of 250 $mW/cm^2$ and a cumulative amount of light of 5,000 $mJ/cm^2$. Accordingly, the cured bodies of Samples 1 to 48 were obtained.

Regarding the tables shown below, the telechelic acrylic polymer used was XMAP (trade name, manufactured by Kaneka Corporation), the polyfunctional acrylic polymer used was Art Cure RA-341 (trade name, manufactured by Negami chemical industrial co., ltd., molecular weight Mw=70,000), the polyurethane acrylate used was UV3000B (trade name, manufactured by Nihon Gosei Kako Co., Ltd.), the polyisoprene acrylate used was UC203 (trade name, manufactured by Kuraray Co., Ltd.), and the polybutadiene acrylate used was BAC45 (trade name, manufactured by Osaka Organic Chemical Industry Ltd.). Furthermore, regarding the monofunctional acrylic monomers, the monofunctional alicyclic acrylic monomer used was isobornyl acrylate or cyclohexyl acrylate, the monofunctional ether-containing acrylic monomer used was ethoxydiethylene or glycol acrylate, the monofunctional aliphatic acrylic monomer used was lauryl acrylate, and the monofunctional imide-containing acrylic monomer used was N-acryloyloxyethyl hexahydrophthalimide. In one instance, an amide monomer, namely, acryloyl morpholine, was used.

Furthermore, regarding the tables, the thixotropic agents used were Aerosil 200, which is a hydrophilic fumed silica, Aerosil RX200, which is a hydrophobic fumed silica having no polar groups, Aerosil R7200, which is a (meth)acryloyl-treated fumed silica, and Aerosil RA200H, which is an amino-treated fumed silica (all trade names and manufactured by Nippon Aerosil Co., Ltd.). Furthermore, the polymerization initiator used was a photoradical polymerization initiator, namely, Omnirad 1173 or Omnirad 127. In the instances where a polyfunctional photocurable monomer was used, the material used was as shown in the tables.

TABLE 1

| | | Sample 1 | Sample 2 | Sample 3 | Sample 4 | Sample 5 | Sample 6 | Sample 7 | Sample 8 | Sample 9 | Sample 10 | Sample 11 |
|---|---|---|---|---|---|---|---|---|---|---|---|---|
| Composition | Telechelic acrylic polymer | 60.9% | 59.4% | 53.7% | 35.4% | 21.2% | 74.8% | 72.2% | 68.7% | 54.2% | 41.7% | 71.5% |
| | Polyfunctional acrylic polymer | 6.8% | 9.2% | 14% | 35% | 54% | 12% | 12% | 11% | 18% | 22% | 11% |
| | Polyurethane acrylate | — | — | — | — | — | — | — | — | — | — | — |
| | Polyisoprene acrylate | — | — | — | — | — | — | — | — | — | — | — |
| | Polybutadiene acrylate | — | — | — | — | — | — | — | — | — | — | — |
| | Monofunctional alicyclic acrylic monomer | Isobornyl acrylate | 23% | 23% | 23% | 23% | 18% | 3% | 6% | 11% | 18% | 27% | 11% |
| | | Cyclohexyl acrylate | — | — | — | — | — | — | — | — | — | — | — |
| | Monofunctional ether-containing acrylic monomer | Ethoxydiethylene glycol acrylate | — | — | — | — | — | — | — | — | — | — | — |
| | Monofunctional aliphatic acrylic monomer | Lauryl acrylate | — | — | — | — | — | — | — | — | — | — | — |
| | Monofunctional amide monomer | Acryloyl morpholine | — | — | — | — | — | — | — | — | — | — | — |
| | Monofunctional imide monomer | N-acryloyloxyethyl hexahydrophthalimide | — | — | — | — | — | — | — | — | — | — | — |
| | Photoinitiator | Omnirad 1173 | 4.5% | 4.6% | 4.5% | 4.6% | 4.8% | 5.0% | 4.8% | 4.5% | 4.8% | 4.5% | 4.5% |
| | | Omnirad 127 | 1.9% | 1.9% | 2.4% | 1.0% | 1.0% | 2.6% | 2.5% | 1.9% | 2.0% | 2.4% | 1.0% |
| | Silica | Aerosil 200 | — | — | — | — | — | — | — | — | — | — | — |
| | | Aerosil RX200 | 2.9% | 1.9% | 2.4% | 1.0% | 1.0% | 2.6% | 2.5% | 2.9% | 3.0% | 2.4% | 1.0% |
| | | Aerosil RA200H | — | — | — | — | — | — | — | — | — | — | — |
| | | Aerosil R7200 | — | — | — | — | — | — | — | — | — | — | — |
| Characteristics | Properties | Martens hardness | 0.15 | 0.14 | 0.14 | 0.11 | 0.10 | 0.07 | 0.12 | 0.14 | 0.18 | 0.22 | 0.13 |
| | | High-temperature compression set | 25 | 17 | 4 | 11 | 15 | 30 | 27 | 29 | 20 | 10 | 27 |
| | | Ultra-high-temperature compression set | — | — | — | — | — | — | — | — | — | — | — |
| | | Compression set degradation amount | — | — | — | — | — | — | — | — | — | — | — |
| | | Adhesion strength test (N/mm²) | 0.14 | 0.31 | 0.28 | 0.23 | 0.20 | 0.12 | 0.14 | 0.16 | 0.18 | 0.35 | 0.16 |
| | | Viscosity 10 rpm (Pa·s) | 136 | 92 | 132 | 63 | 135 | 380 | 244 | 107 | 85 | 108 | 81 |
| | | Viscosity 1 rpm (Pa·s) | 550 | 440 | 510 | 160 | 350 | 1250 | 700 | 360 | 440 | 330 | 140 |
| | | Thixotropic property (1 rpm/10 rpm) | 4.0 | 4.8 | 3.9 | 2.5 | 2.6 | 3.3 | 2.9 | 3.4 | 5.2 | 3.1 | 1.7 |
| Effects | | Water tightness | A | A | A | A | A | A | A | A | A | A | A |
| | | Heat resistance-water tightness | A | A | A | A | A | A | A | A | A | A | A |
| | | Reworkability | B | C | B | B | B | B | B | B | B | C | B |

TABLE 2

| | | Sample 12 | Sample 13 | Sample 14 | Sample 15 | Sample 16 | Sample 17 | Sample 18 | Sample 19 | Sample 20 | Sample 21 | Sample 22 | Sample 23 |
|---|---|---|---|---|---|---|---|---|---|---|---|---|---|
| Composition | Telechelic acrylic polymer | 71.5% | 71.2% | 71.2% | 71.2% | — | 71.2% | — | — | — | — | — | 53.2% |
| | Polyfunctiona lacrylic polymer | 11% | 11% | 11% | 11% | 45.7% | 11% | 9.0% | 9.0% | 9.0% | 9.2% | 9.2% | 18% |
| | Polyurethane acrylate | — | — | — | — | — | — | 64.6% | 64.6% | — | — | — | — |
| | Polyisoprene acrylate | — | — | — | — | — | — | — | — | 64.6% | — | — | — |
| | Polybutadiene acrylate | — | — | — | — | — | — | — | — | — | — | — | 24% |
| | Monofunctional alicyclic acrylic monomer | Isobornyl acrylate | — | — | — | — | 45% | 24% | 23% | 23% | 23% | 23% | 23% | — |
| | | Cyclohexyl acrylate | 11% | — | — | — | — | — | — | — | — | — | — | — |
| | Monofunctional ether-containing acrylic monomer | Ethoxydiethylene glycol acrylate | — | 11% | — | — | — | — | — | — | — | — | — | — |
| | Monofunctional aliphatic acrylic monomer | Lauryl acrylate | — | — | 11% | — | — | — | — | — | — | — | — | — |
| | Monofunctional amide monomer | Acryloyl morpholine | — | — | — | 11% | — | — | — | — | — | — | — | — |
| | Monofunctional imide monomer | N-acryloyloxyethyl hexahydrophthalimide | — | — | — | — | — | — | — | — | — | — | — | — |
| | Photoinitiator | Omnirad 1173 | 4.5% | 4.8% | 4.8% | 4.8% | 4.5% | 4.8% | 5.0% | 5.0% | 5.0% | 4.6% | 4.6% | 4.8% |
| | | Omnirad 127 | — | — | — | — | — | — | — | — | — | — | — | — |
| | Silica | Aerosil 200 | 1.0% | 1.0% | 1.0% | 1.0% | 2.4% | 1.2% | 1.2% | 1.2% | 1.2% | 1.2% | 1.2% | — |
| | | Aerosil RX200 | — | — | — | — | — | — | — | — | — | — | — | — |
| | | Aerosil RA200H | 1.0% | 1.0% | 1.0% | 1.0% | 2.4% | 1.7% | 1.7% | 1.7% | 1.7% | 1.7% | 1.7% | — |
| Characteristics | Properties | Martens hardness | 0.17 | 0.09 | 0.10 | 0.40 | 2.77 | 0.09 | 1.10 | 0.50 | 1.40 | 0.12 | 0.14 | 0.11 |
| | | High-temperature compression set | 28 | 29 | 0 | 56 | 53 | 11 | 25 | 69 | 11 | 12 | 7 | 5 |
| | | Ultra-high-temperature compression set | — | — | — | — | — | — | — | — | — | — | — | — |
| | | Compression set degradation amount | 0.13 | 0.10 | 0.11 | 0.15 | 1.25 | 0.50 | 0.050 | 0.39 | 0.006 | 0.31 | 0.30 | 0.54 |
| | | Adhesion strength test (N/mm²) | 63 | 61 | 52 | 69 | 120 | 10 | 156 | 84 | 11 | 60 | 66 | 21 |
| | | Viscosity 10 rpm (Pa · s) | 224 | 230 | 176 | 140 | 540 | 50 | 290 | 160 | 80 | 200 | 230 | 61 |
| | | Viscosity 1 rpm (Pa · s) | 3.6 | 3.8 | 3.4 | 2.0 | 4.5 | 5.0 | 1.9 | 1.9 | 7.3 | 3.3 | 3.5 | 2.9 |
| | | Thixotropic property (1 rpm/10 rpm) | A | A | A | B | B | A | B | B | B | A | A | A |
| | Effects | Water tightness | A | A | A | B | B | A | A | B | B | A | A | A |
| | | Heat resistance-water tightness | B | B | B | B | E | E | A | B | A | C | C | E |
| | | Reworkability | | | | | | | | | | | | |

TABLE 3

| | | Sample 24 | Sample 25 | Sample 26 | Sample 27 | Sample 28 | Sample 29 | Sample 30 | Sample 31 | Sample 32 | Sample 33 | Sample 34 | Sample 35 |
|---|---|---|---|---|---|---|---|---|---|---|---|---|---|
| Composition | Telechelic acrylic polymer | 61.3% | 60.5% | 55.5% | 55.1% | 55.1% | 55.1% | 55.1% | 55.1% | 54.5% | 53.7% | 53.1% | 52.1% |
| | Polyfunctional acrylic polymer | 9% | 9% | 14% | 14% | 14% | 14% | 14% | 14% | 14% | 14% | 13% | 13% |
| | Polyurethane acrylate | — | — | — | — | — | — | — | — | — | — | — | — |
| | Polyisoprene acrylate | — | — | — | — | — | — | — | — | — | — | — | — |
| | Polybutadiene acrylate | — | — | — | — | — | — | — | — | — | — | — | — |
| | Monofunctional alicyclic acrylic monomer | Isobornyl acrylate | 23% | 23% | 23% | 23% | 23% | 23% | 23% | 23% | 23% | 23% | 22% | 22% |
| | | Cyclohexyl acrylate | — | — | — | — | — | — | — | — | — | — | — | — |
| | Monofunctional ether-containing acrylic monomer | Ethoxydiethylene glycol acrylate | — | — | — | — | — | — | — | — | — | — | — | — |
| | Monofunctional aliphatic acrylic monomer | Lauryl acrylate | — | — | — | — | — | — | — | — | — | — | — | — |
| | Monofunctional amide monomer | Acryloyl morpholine | — | — | — | — | — | — | — | — | — | — | — | — |
| | Monofunctional imide monomer | N-acryloy-oxyethyl hexahydrophthalimide | — | — | — | — | — | — | — | — | — | — | — | — |
| | Photoinitiator | Ominrad 1173 | 4.7% | 4.6% | 4.6% | 5.0% | 5.0% | 5.0% | 5.0% | 5.0% | 4.6% | 4.5% | 4.4% | 4.3% |
| | | Ominrad 127 | 1.0% | 1.2% | 1.2% | — | — | — | — | 1.2% | 1.2% | 1.9% | 1.9% | 1.8% |
| | Silica | Aerosil 200 | — | 1.7% | 1.7% | 2.9% | 2.9% | — | — | 1.7% | 1.7% | 2.9% | 2.8% | 2.7% |
| | | Aerosil RX200 | 1.0% | — | — | — | — | — | — | — | — | — | — | — |
| | | Aerosil RA200H | — | — | — | — | — | — | — | — | — | — | — | — |
| | | Aerosil R7200 | — | — | — | — | — | 2.9% | 2.9% | — | 1.0% | — | 2.8% | 4.1% |
| Characteristics | Properties | Martens hardness | 0.12 | 0.12 | 0.11 | 0.15 | 0.12 | 0.11 | 0.17 | 0.14 | 0.13 | 0.12 | 0.20 | 0.23 |
| | | High-temperature compression set | 9 | 12 | 18 | 15 | 14 | 11 | 8 | 14 | 18 | 18 | 24 | 22 |
| | | Ultra-high-temperature compression set | — | — | — | — | — | — | — | — | — | — | — | — |
| | | Compression set degradation amount | 0.39 | 0.35 | 0.34 | 0.26 | 0.71 | 0.24 | 0.26 | 0.39 | 0.11 | 0.25 | 0.09 | 0.08 |
| | | Adhesion strength test (N/mm²) | 51 | 60 | 58 | 63 | 24 | 37 | 30 | 42 | 62 | 140 | 124 | 165 |
| | | Viscosity 10 rpm (Pa · s) | 140 | 200 | 160 | 160 | 100 | 90 | 72 | 150 | 280 | 520 | 590 | 780 |
| | | Viscosity 1 rpm (Pa · s) | 2.7 | 3.3 | 2.8 | 2.5 | 4.2 | 2.4 | 2.4 | 3.6 | 4.5 | 3.7 | 4.8 | 4.7 |
| | | Thixotropic property (1 rpm/10 rpm) | A | A | A | A | A | A | A | A | A | A | A | A |
| Effects | | Water tightness | A | A | A | A | A | A | A | A | A | A | A | A |
| | | Heat resistance-water tightness | C | C | C | C | E | C | C | C | B | B | A | A |
| | | Reworkability | | | | | | | | | | | | |

TABLE 4

| | | Sample 36 | Sample 37 | Sample 38 | Sample 39 | Sample 40 | Sample 41 | Sample 42 | Sample 43 | Sample 44 | Sample 45 | Sample 46 | Sample 47 | Sample 48 |
|---|---|---|---|---|---|---|---|---|---|---|---|---|---|---|
| Composition | Telechelic acrylic polymer | 69.0% | 69.0% | 69.0% | 69.0% | 69.0% | 68.9% | 68.9% | 68.9% | 69.0% | 69.0% | 68.0% | 68.9% | 69.0% |
| | Polyurethane acrylic polymer | 11% | 11% | 11% | 11% | 11% | 11% | 11% | 11% | 11% | 11% | 11% | 11% | 11% |
| | Polyurethane acrylate | — | — | — | — | — | — | — | — | — | — | — | — | — |
| | Polyisoprene acrylate | — | — | — | — | — | — | — | — | — | — | — | — | — |
| | Polybutadiene acrylate | — | — | — | — | — | — | — | — | — | — | — | — | — |
| | Monofunctional alicyclic acrylic monomer | Isobornyl acrylate | 6.7% | 6.7% | 6.7% | 6.7% | 6.7% | 4.5% | 4.5% | 4.5% | 8.9% | 8.0% | 6.7% | 4.5% | 3.6% |
| | | Cyclohexyl acrylate | — | — | — | — | — | — | — | — | — | — | — | — | — |
| | Monofunctional ether-containing acrylic monomer | Ethoxydiethylene glycol acrylate | — | — | — | — | — | — | — | — | — | — | — | — | — |
| | Monofunctional aliphatic acrylic monomer | Lauryl acrylate | — | — | — | — | — | — | — | — | — | — | — | — | — |
| | Monofunctional amide monomer | Acryloyl morpholine | — | — | — | — | — | — | — | — | — | — | — | — | — |
| | Monofunctional imide monomer | N-acryloyloxyethyl hexahydrophthalimide | — | — | — | — | — | 2.7% | 2.7% | 4.5% | — | — | — | — | — |
| | Polyfunctional photocurable monomer | Tris(2-acryloyloxyethyl) isocyanurate | — | — | — | — | — | — | — | — | — | 0.9% | 2.2% | 4.5% | 5.3% |
| | | 2-Hydroxy-1,3-dimethacryl-oxypropane | 2.2% | — | — | — | — | — | — | — | — | — | — | — | — |
| | | Trimethylol-propane triacrylate | — | 2.2% | — | — | — | — | — | — | — | — | — | — | — |
| | | Pentaerythritol tetraacrylate | — | — | 2.2% | — | — | — | — | — | — | — | — | — | — |
| | | Pentaerythritol tri- and tetra-acrylate | — | — | — | 2.2% | — | — | — | — | — | — | — | — | — |
| | | Dipentaerythritol polyacrylate | — | — | — | — | 2.2% | — | — | — | — | — | — | — | — |
| | | Bisphenol A diphenyl ether bismalei-mide | — | — | — | — | — | 1.8% | — | — | — | — | — | — | — |
| | | 1,6-Bismaleimido-(2,2,4-trimethyl) hexane | — | — | — | — | — | — | 1.8% | — | — | — | — | — | — |
| Photoinitiator | Omnirad 1173 | 4.5% | 4.5% | 4.5% | 4.5% | 4.5% | 4.5% | 4.5% | 4.5% | 4.5% | 4.5% | 4.5% | 4.5% | 4.5% |
| | Omnirad 127 | — | — | — | — | — | — | — | — | — | — | — | — | — |
| Silica | Aerosil 200 | 3.3% | 3.3% | 3.3% | 3.3% | 3.3% | 3.3% | 3.3% | 3.3% | 3.3% | 3.3% | 3.3% | 3.3% | 3.3% |
| | Aerosil RX200 | — | — | — | — | — | — | — | — | — | — | — | — | — |
| | Aerosil RA200H | 3.3% | 3.3% | 3.3% | 3.3% | 3.3% | 3.3% | 3.3% | 3.3% | 3.3% | 3.3% | 3.3% | 3.3% | 3.3% |
| | Aerosil R7200 | — | — | — | — | — | — | — | — | — | — | — | — | — |

TABLE 4-continued

| Characteristics | Properties | | Sample 36 | Sample 37 | Sample 38 | Sample 39 | Sample 40 | Sample 41 | Sample 42 | Sample 43 | Sample 44 | Sample 45 | Sample 46 | Sample 47 | Sample 48 |
|---|---|---|---|---|---|---|---|---|---|---|---|---|---|---|---|
| | Martens hardness | | 0.22 | 0.36 | 0.39 | 0.37 | 0.36 | 0.21 | 0.26 | 0.19 | 0.13 | 0.15 | 0.21 | 0.34 | 0.40 |
| | High-temperature compression set | | 16 | 19 | 18 | 16 | 17 | 27 | 23 | 26 | 34 | 34 | 21 | 29 | 25 |
| | Ultra-high-temperature compression set | | 33 | 23 | 21 | 30 | 28 | 38 | 24 | 38 | 64 | 47 | 29 | 30 | 39 |
| | Compression set degradation amount | | 17 | 4 | 3 | 14 | 11 | 11 | 1 | 13 | 30 | 13 | 8 | 1 | 14 |
| | Adhesion strength test (N/mm$^2$) | | 0.12 | 0.17 | 0.18 | 0.18 | 0.17 | 0.16 | 0.12 | 0.26 | 0.20 | 0.18 | 0.18 | 0.22 | 0.22 |
| | Viscosity 10 rpm (Pa · s) | | 377 | 319 | 183 | 242 | 439 | 431 | 210 | 498 | 332 | 335 | 324 | 203 | 290 |
| | Viscosity 1 rpm (Pa · s) | | 1410 | 1240 | 1160 | 1650 | 1170 | 1650 | 980 | 1540 | 1200 | 880 | 910 | 790 | 1000 |
| | Thixotropic property (1 rpm/10 rpm) | | 3.7 | 3.9 | 6.3 | 6.8 | 2.7 | 3.8 | 4.7 | 3.1 | 3.6 | 2.6 | 2.8 | 3.9 | 3.4 |
| Effects | Water tightness | | A | A | A | A | A | A | A | A | A | A | A | A | A |
| | Heat resistance-water tightness | | A | A | A | A | A | A | A | A | A | A | A | A | A |
| | Reworkability | | B | B | B | B | B | B | B | B | B | B | B | B | B |

<Various Tests and Evaluations>:

Various tests, which will be described below, were conducted on the samples described above, and properties of the photocurable compositions and the cured bodies thereof were evaluated.

Martens Hardness (N/Mm$^2$):

A nanoindentation test was conducted on the cured body of each of the samples with a nanoindenter (ENT-2100, manufactured by Elionix Inc.). The test specimen used was a cured body prepared as follows. The photocurable composition was applied to a thickness of 200 μm onto a glass plate having a thickness of 1 mm, and then, the photocurable composition was cured by being irradiated with UV radiation from a high-pressure mercury lamp under conditions including an illuminance of 250 mW/cm$^2$ and a cumulative amount of light of 5,000 mJ/cm$^2$. The Martens hardness of the cured bodies was measured with the nanoindenter under conditions including an indentation maximum load of 0.1 mN and an indentation speed of 0.01 mN/second. The results are shown in the tables.

High-Temperature Compression Set:

A test specimen of each of the samples was prepared under the conditions described below, and a compression set was measured by using a jig and conditions that are in accordance with JIS K6262:2013.

Cured products were prepared, each of which was formed by applying the photocurable composition to a thickness of approximately 1 mm. Pieces of the cured product were stacked together to give a test specimen of 10 mm (length)× 10 mm (width)×4 mm (thickness) (initial thickness: $t_0$) (in this instance, 4 pieces of the cured product were stacked). Furthermore, the test specimen was compressed by 25% in the jig in accordance with the JIS standard, then placed in a constant-temperature chamber, and allowed to stand at an ambient temperature of 120° C. for 100 hours. Note that when the test specimen was compressed in the jig, a polyethylene terephthalate film (thickness: 0.1 mm) with a silicone release layer was disposed between the jig and the test specimen, with no lubricant being used. Thereafter, the jig was taken out from the constant-temperature chamber, and the compressed test specimen was removed from the jig. Subsequently, the test specimen was allowed to stand in an atmosphere at room temperature (i.e., 23±2° C.) for 30 minutes, and subsequently, a thickness (t) of the test specimen was measured. A value of the thickness (t) after the test relative to the initial thickness ($t_0$) was calculated according to the equation shown below. For each of the samples, the same test was conducted three times, and an arithmetic mean of the values was calculated. The results are shown in a "High-temperature compression set" column of the tables. Note that the lower the high-temperature compression set, the more preferable.

$$\text{High-temperature compression set } (CS\ (\%)) = \{(t_0-t)/(0.25 \times t_0)\} \times 100$$

Ultra-High-Temperature Compression Set:

A compression set was measured as in the above-described method for measuring the high-temperature compression set, under the same conditions and in the same manner, except that the test specimen was placed in a constant-temperature chamber and allowed to stand at an ambient temperature of 150° C., rather than 120° C., for 100 hours. The results are shown in an "Ultra-high-temperature compression set" column of the tables. Furthermore, a compression set degradation amount was determined as a difference between the value of the high-temperature compression set and the value of the ultra-high-temperature compression set and is shown in the tables. Note that regarding the ultra-high-temperature compression set, too, the lower the value, the more preferable. Furthermore, it is preferable that the difference between the high-temperature compression set and the ultra-high-temperature compression set be small. That is, the lower the compression set degradation amount, the more preferable. This is because when the value is small, an influence in the instance of exposure to a high temperature of 150° C. is small.

Adhesion Strength Test:

An adhesion strength test was conducted as follows. First, an application base member and a compression base member were prepared. The application base member simulated a case of an electronic device and was an object to which each of the samples was to be applied. The compression base member simulated a cap that tightly closes the case. The application base member was a block made from a polycarbonate resin, having outer dimensions of 80 mm×80 mm×15 mm and a surface that was a glossy surface. The compression base member was a block made from aluminum, having outer dimensions of 74 mm×74 mm×15 mm and having a surface that served as a compression surface, which had a surface roughness of ▽▽ (a normal finish for surface finishing). Each of the blocks had holes for securing bolts in four corners, and thus, the application base member and the compression base member were configured to be secured to each other with a predetermined spacing therebetween with the use of a spacer. Furthermore, the compression base member had a securing portion on a middle region of one of the surfaces (a surface that did not come into contact with the sample). The securing portion was provided for securing a hook of a load cell thereto for a tensile test.

Subsequently, each of the samples was applied to the application base member. The application was performed with an air-powered dispenser (manufactured by Musashi Engineering, Inc.) in a manner such that the applied sample had a square U-shape corresponding to three sides of a square having outer dimensions of 40 mm (sides) and had an application width of approximately 4 mm. Thereafter, each of the samples was cured by being irradiated with UV radiation from a high-pressure mercury lamp, at an illuminance of 250 mW/cm$^2$ and a cumulative amount of light of 5,000 mJ/cm$^2$.

For each of the cured samples, the compression base member was secured with bolts together with a spacer disposed with a space such that the sample could be compressed by 25% (i.e., a space such that a height of the applied sample could become 75%).

Next, the samples in the compressed state were allowed to stand in a constant-temperature chamber at 70° C. for 22 hours and subsequently cooled by being left at room temperature (25° C.) for 1 hour. Thereafter, the bolts were removed to release the compressive pressure. Note that at this stage, the application base member, the sample, and the compression base member were in an integrated state because the compression base member and the sample adhered to each other. Thereafter, the application base member was secured to a test bench, a hook of a load cell was secured to the securing portion of the compression base member, and the compression base member was pulled away from the sample under conditions including a crosshead speed of 500 mm/min. In this instance, a maximum stress was recorded, and an adhesion strength (N/mm$^2$) was calculated by dividing the maximum stress by an adhesion area. Note that the adhesion area was calculated from a width and a length of a mark made by the adhesion of the compression jig that had been pulled away.

Thixotropic Property:

The thixotropic ratio of each of the samples was determined to evaluate the thixotropic property. The thixotropic ratio is a value determined as follows: viscosities were measured with a B-type rotational viscometer, at a measurement temperature of 25° C. and rotational speeds of 1 rpm and 10 rpm, and a ratio of the viscosity at 1 rpm to the viscosity at 10 rpm was calculated to give the value. The upper limit of the thixotropic ratio is not limited and preferably may be less than or equal to approximately 20. The upper limit is preferably greater than or equal to 2 and more preferably greater than or equal to 4. The results of the calculation are shown in the tables.

Water Tightness:

A test specimen of each of the samples, which is described below, was prepared, and a test in accordance with IPX-7, specified in JIS C0920, was conducted. Specifically, the photocurable composition was applied from a dispenser to a polycarbonate plate having a thickness of 1 mm such that the photocurable composition formed a frame shape with a line width of approximately 2.0 mm, a thickness of approximately 1.4 mm, and outer dimensions of 30×30 mm, and thereafter, the photocurable composition was cured by being irradiated with UV radiation; accordingly, a test specimen that was a frame-shaped cured body was prepared. In the instance of samples that had a very poor shape retention property, formation with the use of a dispenser was difficult, and, accordingly, a test specimen was prepared as follows. A sheet-shaped cured body, having a thickness of 1.4 mm, of the photocurable composition was prepared, and from the sheet, a frame-shaped cured body with a line width of 2.0 mm, a thickness of 1.4 mm, and outer dimensions of 30×30 mm was formed by using a cutting die, and the cured body was bonded to a polycarbonate plate having a thickness of 1 mm. Thereafter, the cured body was compressed by 25% with another polycarbonate plate having a thickness of 1 mm, and the resultant was held at 70° C. for 22 hours. Subsequently, a submergence control label (irreversible) (MZ-R, manufactured by As One Corporation) was attached to an inside of the frame-shaped cured body, and the cured body was compressed again by 15% with the polycarbonate plate having a thickness of 1 mm. The resultant was used as a test specimen of the sample. Thereafter, each of the test specimens was submerged to a depth of 1 m in water and held for 30 minutes, and subsequently, visual examination was performed to determine whether ingress of water into a region inward of the gasket occurred. The results were evaluated as "water ingress did not occur" or "water ingress occurred". The results are shown in the tables.

A: Water ingress did not occur.

B: Water ingress occurred.

Heat Resistance-Water Tightness:

The heat resistance of the cured body of the photocurable composition was evaluated by conducting a test of heat resistance-water tightness and using the results. A test similar to the test described above in the "Water Tightness" section was conducted on the test specimens that had undergone the above-described high-temperature compression set test, in which the test specimens had been compressed by 25% and allowed to stand at 120° C. for 100 hours. The evaluations were made as follows. The results are shown in the tables.

A: Water ingress did not occur.

B: Water ingress occurred.

Reworkability:

For the evaluation of reworkability, evaluations were performed by partially changing the conditions of the adhesion strength test. The changes were as follows. First, the compression base member was replaced with a cover made of an aluminum sheet having outer dimensions of 80 mm×80 mm×1 mm. The samples were likewise compressed to be in a 25% compressed state and were left at room temperature (25° C.) for one week. Subsequently, the aluminum sheet was peeled away by hand, and the reworkability was evaluated based on the manner in which the peeling was accomplished. Specifically, the evaluations were made as follows, based on the differences in a state associated with the removal of the cover. The results are shown in the tables.

A: The cover was removed with no resisting force.

B: The cover was removed by applying a slight force.

C: The cover was removed against a resisting force having a magnitude greater than that of a slight force.

E: The cover was not appropriately removed, and destruction of the gasket or breakage of the cover occurred.

<Analysis of Test Results>:

Sample 17, which contained no polyfunctional acrylic polymer or fumed silica, had poor reworkability. In contrast, it was found that all of Samples 1 to 14, which contained a polyfunctional acrylic polymer, a telechelic acrylic polymer, a monofunctional acrylic monomer, and a fumed silica, had water tightness, heat resistance-water tightness (heat resistance), and reworkability.

Sample 6 had excellent water tightness and reworkability; however, because of the low content of the monofunctional alicyclic acrylic monomer of 3 mass %, Sample 6 had a somewhat high viscosity, which indicated a possible difficulty in application, and, therefore, was inferior in terms of workability. This indicated that specifying the content of a monofunctional acrylic monomer to be greater than or equal to 5% is preferable. Furthermore, there was a tendency for cured products to be harder as the content of an alicyclic acrylic monomer was increased, and when the content was greater than or equal to 27 mass %, there was a tendency for reworkability to be somewhat degraded while no problems arose with water tightness.

In a comparison between Samples 11 to 15, all of Samples 11 to 14, which contained a monofunctional acrylic monomer, had excellent water tightness, heat resistance-water tightness, and reworkability. In contrast, Sample 15, which contained no predetermined monofunctional acrylic monomer, had poor heat resistance-water tightness.

From Samples 16, 18, 19, and 20, it was found that in the instances where no telechelic acrylic polymer was included, at least one of water tightness and heat resistance-water tightness was degraded. In particular, in Samples 18 to 20, in which the telechelic acrylic polymer was replaced with a photocurable polymer that was a non-acrylic polymer, water tightness was inferior. It was found that among these samples, Samples 18 and 20 had a high Martens hardness value and, therefore, had poor flexibility, and Samples 19 and 20 presented a further problem, regarding the heat resistance-water tightness. Note that regarding Sample 20, the sample cracked during the high-temperature compression set test, and, therefore, the measurement of the compression set was not performed. Accordingly, no result is shown in the column. On the other hand, from Sample 17, it was found that in the instance where neither a polyfunctional acrylic polymer nor a fumed silica was included, reworkability was poor.

From a comparison between Sample 21 and Sample 22, it was found that even in the instance where the photoradical polymerization initiator was replaced with a different photoradical polymerization initiator, water tightness, heat resistance-water tightness, and reworkability were provided.

Regarding Samples 23 to 35, silica was studied. All of Samples 24 to 27 and 29 to 35, which contained at least one of a hydrophilic fumed silica or a fumed silica having a polar group and contained a telechelic acrylic polymer and a monofunctional acrylic monomer, had water tightness, heat resistance-water tightness, and reworkability. On the other hand, Sample 23, which contained no fumed silica, and Sample 28, which only contained a fumed silica that was not hydrophilic and had no polar group, had poor reworkability. It was found that in instances where a hydrophilic fumed silica or a fumed silica having a polar group is used, reworkability is enhanced as the amount of inclusion of the fumed silica increases, in which case, however, there are tendencies for the hardness to somewhat increase, for the heat resistance to be somewhat reduced, and for the viscosity to increase. In view of workability, in particular, it is particularly preferable that the content of any of these fumed silicas be less than or equal to approximately 5 mass %. Furthermore, from a comparison between Samples 26 and 31, it was found that the viscosity at 10 rpm did not vary significantly, but in the instances where a hydrophilic fumed silica and an amino-treated fumed silica were used in combination, the thixotropic property was increased without compromising reworkability.

Regarding Samples 36 to 48, the addition of a crosslinking agent was studied, and it was found that the addition of a crosslinking agent made from a polyfunctional photocurable monomer to the composition containing a telechelic acrylic polymer, a polyfunctional acrylic polymer, a monofunctional acrylic monomer, a hydrophilic fumed silica, and a fumed silica having a polar group produces the following effects: not only the high-temperature compression set in a 120° C. atmosphere but also the ultra-high-temperature compression set in a 150° C. atmosphere was low; and properties can be easily maintained even at very high temperatures.

Furthermore, it was found that Samples 37, 38, and 42 had values of the ultra-high-temperature compression set within a range of 21 to 24, which were smaller than those of other samples, and, therefore, these samples were excellent. This demonstrated that polyfunctional photocurable monomers having an aliphatic skeleton and having no polar groups are preferable from the standpoint of even limiting the ultra-high-temperature compression set to a low level.

Among Samples 45 to 48, in which a content of a polyfunctional photocurable monomer, which served as a crosslinking agent, was 0.9 to 5.3% in the composition, Sample 47, in which the content was 4.5%, was most preferable in terms of the value of the compression set degradation amount, and Samples 46 and 47 were most preferable in terms of the values of the high-temperature compression set, which were approximately equal between these samples. A comprehensive review of these results and the contents of the polyfunctional photocurable monomer of Samples 36 to 48 suggested that it is more preferable that the content of the polyfunctional photocurable monomer in the composition be 1.8 to 4.5%.

The invention claimed is:
1. A photocurable composition comprising:
a telechelic acrylic polymer having an acryloyl group at both ends, the telechelic acrylic polymer being present in an amount of 22 to 71 mass %;
a polyfunctional acrylic polymer having acryloyl groups, the polyfunctional acrylic polymer being present in an amount of 7 to 54 mass %;
a monofunctional acrylic monomer selected from a monofunctional alicyclic (meth)acrylic acid ester monomer, a monofunctional aliphatic (meth)acrylic acid ester monomer, a monofunctional ether-containing (meth)acrylic acid ester monomer, and a monofunctional imide-containing (meth)acrylic acid ester monomer, the monofunctional acrylic monomer being present in an amount of 3 to 27 mass %;
a polyfunctional photocurable monomer being present in an amount of 0 to 10 mass %; and
a fumed silica including at least one of a hydrophilic fumed silica or a fumed silica having a polar group, the fumed silica being present in an amount of 2 to 10 mass %, wherein
the photocurable composition has a Martens hardness of 0.07 to 0.75 N/mm$^2$, where the Martens hardness is a hardness after the photocurable composition is cured.

2. The photocurable composition according to claim 1, wherein the fumed silica includes the hydrophilic fumed silica and a hydrophobic fumed silica having a polar group.

3. The photocurable composition according to claim 1, wherein the fumed silica having the polar group includes an amino-treated fumed silica.

4. The photocurable composition according to claim 1, wherein the photocurable composition has an adhesion strength with respect to aluminum of 0.45 N/mm$^2$ or less, where the adhesion strength is an adhesion strength after the photocurable composition is cured and compressed at 70° C. for 22 hours.

5. The photocurable composition according to claim 1, wherein the photocurable composition has a compression set of 40% or less, where the compression set is a compression set after the photocurable composition is cured and allowed to stand at 120° C. for 100 hours in accordance with JIS K6262:2013.

6. A cured body of the photocurable composition according to claim 1.

7. A gasket comprising a cured body of the photocurable composition according to claim 1.

8. A watertight structure comprising:
a case having an opening;
a cap member closing the opening; and
a gasket made of a cured body of the photocurable composition according to claim 1, the gasket being provided on at least one of the case or the cap member, the gasket being a gasket that liquid-tightly seals the opening by being compressed and deformed by fitting between the case and the cap member.

9. A method for manufacturing a gasket, the method comprising the steps of:
applying the photocurable composition according to claim 1 to an object that is to be sealed; and
irradiating the applied photocurable composition with actinic radiation.

* * * * *